Nov. 20, 1928.
T. E. McCARTY ET AL
STORAGE BATTERY
Filed Aug. 7, 1926
1,692,217
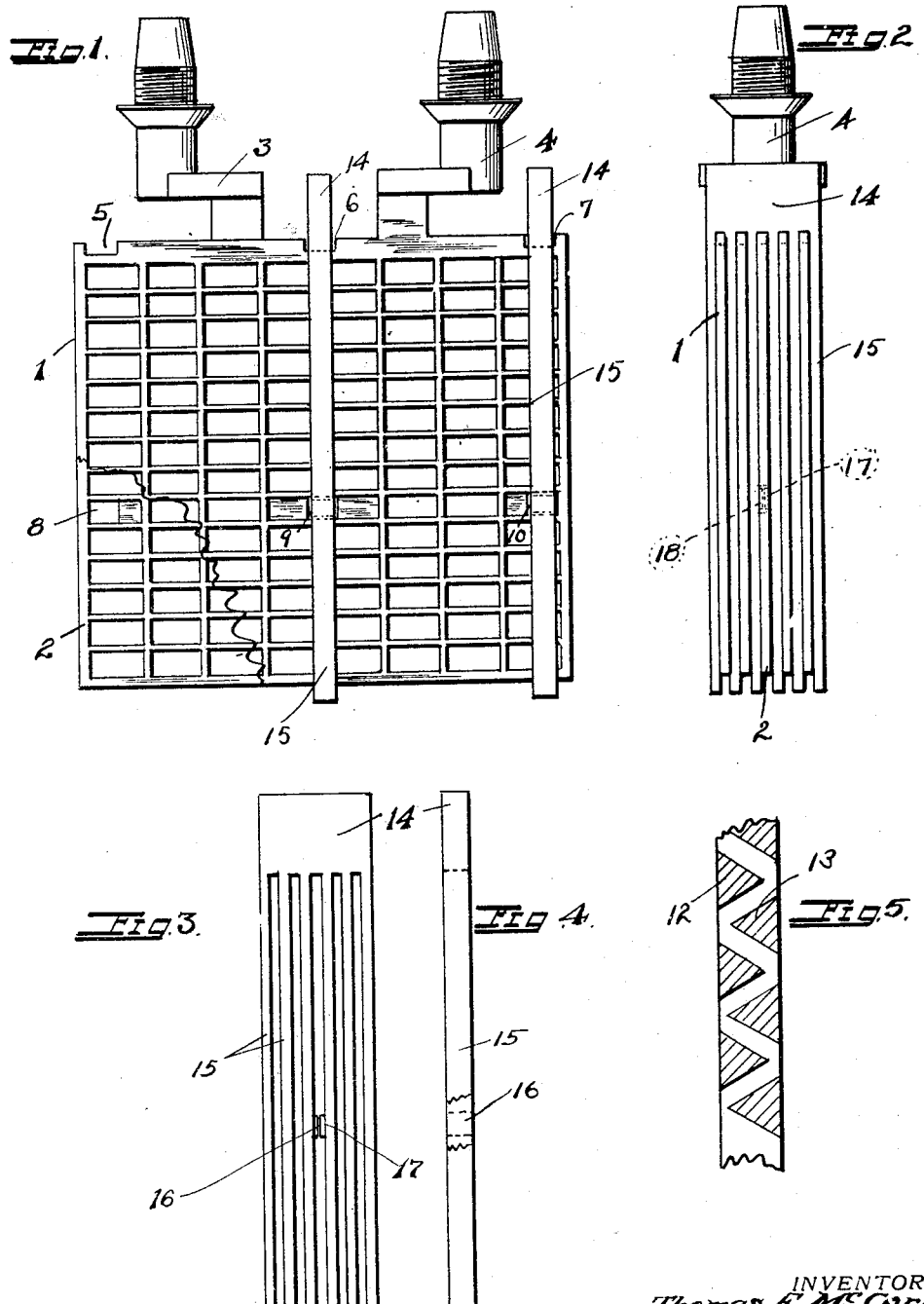
INVENTOR.
Thomas E. McCarty
Harold E. Salisbury
BY
Carlos P. Griffin
ATTORNEY.

Patented Nov. 20, 1928.

1,692,217

UNITED STATES PATENT OFFICE.

THOMAS E. McCARTY AND HAROLD E. SALISBURY, OF OAKLAND, CALIFORNIA.

STORAGE BATTERY.

Application filed August 7, 1926. Serial No. 127,744.

This invention relates to a storage battery and the means for holding the plates thereof in a fixed position with respect to each other. An object of the invention is to reduce the internal resistance of the battery thereby making it charge and discharge at a higher rate. This battery is of the type in which the means to separate the plates one from another has been reduced to the minimum for the purpose of reducing the internal resistance of the battery, and to give space for a greater amount of solution than can be placed in a separator type battery of the same size.

Another object of the invention is to produce a battery which will operate satisfactorily upon an acid of a specific gravity from one point 25 to one point 26, whereas the common separator type battery must use acid from one point 3 to one point 3/5 to operate satisfactorily.

Another object of the invention is to so produce a battery as to make it much more easily assembled, and to secure the plates together when once assembled.

Another object of the invention is to produce a series of keys for locking the plates together, which will so connect the plates as to prevent the collection of sediment which might short circuit the battery plates.

Another object of the invention is to reduce the quantity of lumber or rubber required for the construction of the locking keys.

Another object of the invention is to so arrange the plate locking keys as to prevent them from aiding in the collection of sediment thereby short circuiting the plates.

Another object of the invention is to provide for an increased quantity of solution in the battery jar or cell, thereby improving the life of the battery.

Other objects of the invention will be apparent as the description proceeds.

An embodiment of the invention is shown in the accompanying drawing in which the same reference numeral is applied to the same portion throughout the several figures of the drawings, and of which there may be modifications.

Figure 1 is a side elevation of an assembled set of positive and negative plates showing two of the plate separators in position, the third separator being removed therefrom, Figure 2 is a side elevation of one of the spreaders showing the adjacent plate terminal, Figure 3 is a side elevation of one of the plate separators removed from the battery, Figure 4 is a sectional view of one of the plates to indicate the locking openings therein, and Figure 5 is a sectional view of a part of one of the plates.

This battery is of the well-known type in which there are two sets of plates 1 and 2 attached respectively to the terminals 3 and 4. The plates are placed alternately with respect to each other, and each plate has three notches 5, 6, and 7 with three holes 8, 9 and 10 in a line about the middle height of the plate.

The plates may be of any desired well-known type, the bars of the plates preferably being cast in the form indicated in the sketch, (Figure 5), whereby the complementary bars 12 and 13 are oppositely placed to prevent the accidental loss of the lead compound used upon the plates.

In the present case, the separators consist of a back or solid portion 14, which portion has a groove cut in it to fit each plate whereby a series of comb-like teeth 15 are produced. About the middle of the length of the inner set of comb teeth each tooth is provided with a short lug 16 and 17, there being two such lugs for securing the comb permanently in place between the two sets of plates when the battery is being assembled. These combs allow the maximum quantity of acid solution to be placed in the jar along with the plates, and said plates are held off the bottom of the jar in the usual manner, and between the projecting lower ends of the separators. These separators are placed between the plates of the battery a sufficient distance from each other to insure against any buckling of the plates forming a short circuit.

When once the combs are assembled between the several plates, (as shown in Figures 1 and 2), the set of plates may be picked up without danger of dropping a part, as is the case with the ordinary set of plates where flat separators are used to hold the plates apart, and because of the clearance between the several plates the electro-lyte is always maintained in the battery in sufficient quantity to keep the plates cool and avoid buckling.

When the battery is to be repaired the separators can be very readily removed therefrom by reason of the fact that the central pair of plates is pushed slightly further apart than normal, whereupon the separating combs may be promptly and easily pulled out, or replaced, if desired.

Having thus described our invention, what we desire to secure by Letters Patent of the United States is as follows, but modifications may be made in carrying out the invention as shown in the drawings and in the above particularly described form thereof, within the purview of the annexed claim.

A storage battery with positive and negative plates having notches on the top of the plates and holes therethrough, insulating combs adapted to fit in said notches with teeth extending below the holes in the plates, and lugs in register with the holes to lock said combs and to hold the plates together.

In testimony whereof we have hereunto set our hands this 30th day of July, A. D., 1926.

THOMAS E. McCARTY.
HAROLD E. SALISBURY.